(12) United States Patent
Murakami et al.

(10) Patent No.: US 8,267,587 B2
(45) Date of Patent: Sep. 18, 2012

(54) HOUSING FOR FLUID LUBRICATION BEARING APPARATUSES

(75) Inventors: Kazutoyo Murakami, Kuwana (JP); Masaki Egami, Kuwana (JP)

(73) Assignee: NTN Corporation, Osaka-shi (JP)

( * ) Notice: Subject to any disclaimer, the term of this patent is extended or adjusted under 35 U.S.C. 154(b) by 889 days.

(21) Appl. No.: 11/912,244

(22) PCT Filed: Apr. 11, 2006

(86) PCT No.: PCT/JP2006/307650
§ 371 (c)(1),
(2), (4) Date: Dec. 15, 2008

(87) PCT Pub. No.: WO2006/126336
PCT Pub. Date: Nov. 30, 2006

(65) Prior Publication Data
US 2010/0061669 A1 Mar. 11, 2010

(30) Foreign Application Priority Data
May 24, 2005 (JP) ................. 2005-151608
May 24, 2005 (JP) ................. 2005-151609

(51) Int. Cl.
*F16C 32/06* (2006.01)
(52) U.S. Cl. ......... 384/100; 384/607; 384/909; 384/911
(58) Field of Classification Search ................ 384/100, 384/107, 114, 119, 130, 607, 611, 909, 911
See application file for complete search history.

(56) References Cited

U.S. PATENT DOCUMENTS

| | | | | |
|---|---|---|---|---|
| 4,934,836 A | * | 6/1990 | Tanaka et al. | 384/100 |
| 5,697,709 A | * | 12/1997 | Mori et al. | 384/297 |
| 5,731,373 A | * | 3/1998 | Hirose et al. | 524/447 |
| 5,912,320 A | * | 6/1999 | Hotta et al. | 528/373 |
| 6,079,465 A | | 6/2000 | Takeyama et al. | |
| 6,582,130 B2 | * | 6/2003 | Yokouchi et al. | 384/492 |

(Continued)

FOREIGN PATENT DOCUMENTS
JP 64-69657 A 3/1989
(Continued)

OTHER PUBLICATIONS

International Search Report of PCT/JP2006/307650, date of mailing May 23, 2006.

*Primary Examiner* — Marcus Charles
(74) *Attorney, Agent, or Firm* — Westerman, Hattori, Daniels & Adrian, LLP

(57) ABSTRACT

A housing for a fluid lubrication bearing apparatus is formed of a resin composition containing polyphenylene sulfide (PPS) as a base resin. The ratio of the base resin to the resin composition is not lower than 40 vol % but not higher than 70 vol %. Moreover, in the composition, an epoxy compound having two or more epoxy groups per molecule of the compound and epoxy value of 0.5 meq/g or more to the resin composition may be added so that the amount of epoxy groups in the resin composition is 8 meq/100 g or more. A carbon fiber may also be added to the resin composition in an amount of not less than 10 vol % but not more than 35 vol %. An inorganic compound may be further added to the resin composition to be the remainder of the resin composition.

16 Claims, 10 Drawing Sheets

U.S. PATENT DOCUMENTS

| | | | |
|---|---|---|---|
| 6,916,527 B2 * | 7/2005 | Ikegawa et al. | 428/301.1 |
| 7,012,768 B2 * | 3/2006 | Hirose et al. | 359/822 |
| 7,025,505 B2 * | 4/2006 | Komori et al. | 384/107 |
| 7,250,469 B2 * | 7/2007 | Tsutsumi et al. | 525/107 |
| 2002/0005181 A1 * | 1/2002 | Moroi et al. | 123/142.5 R |
| 2004/0017954 A1 * | 1/2004 | Komori et al. | 384/100 |
| 2004/0159159 A1 * | 8/2004 | Oda et al. | 73/753 |
| 2004/0264817 A1 * | 12/2004 | Satoji et al. | 384/100 |
| 2005/0220378 A1 | 10/2005 | Kaneko et al. | |
| 2005/0254735 A1 * | 11/2005 | Satoji et al. | 384/107 |
| 2005/0285349 A1 * | 12/2005 | Hori et al. | 277/427 |

FOREIGN PATENT DOCUMENTS

| | | | | |
|---|---|---|---|---|
| JP | 03207755 A | * | 9/1991 | |
| JP | 6-279689 A | * | 10/1994 | |
| JP | 07228883 A | * | 8/1995 | |
| JP | 8-92465 A | | 4/1996 | |
| JP | 08100817 A | * | 4/1996 | |
| JP | 8-217922 A | | 8/1996 | |
| JP | 11-191234 A | | 7/1999 | |
| JP | 2004-2560 A | | 1/2004 | |
| JP | 2004132403 A | * | 4/2004 | |
| JP | 2004-263821 A | | 9/2004 | |
| JP | 2005090637 A | * | 4/2005 | |
| JP | 2005090754 A | * | 4/2005 | |
| JP | 2005114164 A | * | 4/2005 | |
| JP | 2005147265 A | * | 6/2005 | |
| JP | 2006046431 A | * | 2/2006 | |

* cited by examiner

Fig. 7

| Name | Ex. 1 | Ex. 2 | Ex. 3 | Ex. 4 | Ex. 5 | Ex. 6 | Ex. 7 |
|---|---|---|---|---|---|---|---|
| Linear PPS | 51 | 51 | 51 | 69 | 51 | 46 | 56 |
| Carbon fiber | 20 | 20 | 20 | 20 | 20 | 20 | 34 |
| Carbon black | 4 | 4 | 4 | 4 | 4 | 4 | |
| Inorganic compound No. 1 | 25 | | | | | | |
| Inorganic compound No. 2 | | 25 | | | | | |
| Inorganic compound No. 3 | | | 25 | | | | |
| Inorganic compound No. 4 | | | | 7 | 25 | 30 | 10 |
| Inorganic compound No. 5 | | | | | | | |
| Inorganic compound No. 6 | | | | | | | |

Compounding ratio : vol%

Fig. 8

| Name | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| Linear PPS | 56 | 56 | 76 | 76 | 73 | 73 | 73 | 37 |
| Carbon fiber | 20 | 20 | 24 | 20 | 20 | 20 | 20 | 24 |
| Carbon black | 4 | 4 | | 4 | 4 | 4 | 4 | 4 |
| Inorganic compound No. 1 | | | | | | | | |
| Inorganic compound No. 2 | | | | | | | | |
| Inorganic compound No. 3 | | | | | | | | |
| Inorganic compound No. 4 | | | | | 3 | | | 35 |
| Inorganic compound No. 5 | 20 | | | | | 3 | | |
| Inorganic compound No. 6 | | 20 | | | | | 3 | |

Compounding ratio : vol%

Fig. 9

| Item | Examples | | | | | | |
|---|---|---|---|---|---|---|---|
| | 1 | 2 | 3 | 4 | 5 | 6 | 7 |
| (1) Presence or absence of ion elution | ○ | ○ | ○ | ○ | ○ | ○ | ○ |
| Judgement | | | | | | | |
| (2) Volume resistance, Ω·cm | $2.2 \times 10^2$ | $2.1 \times 10^2$ | $2.2 \times 10^2$ | $1.4 \times 10^1$ | $2.3 \times 10^2$ | $1.0 \times 10^3$ | $8.5 \times 10^0$ |
| Judgement | ○ | ○ | ○ | ○ | ○ | ○ | ○ |
| (3) Oil resistance (decreasing rate of pull strength, %) | 8.3 | 8.6 | 8.6 | 8.1 | 7.5 | 6.8 | 9.1 |
| Judgement | ○ | ○ | ○ | ○ | ○ | ○ | ○ |
| (4) Extension, % | 3.8 | 3.6 | 3.7 | 4.5 | 3.5 | 3.1 | 3.6 |
| Judgement | ○ | ○ | ○ | ○ | ○ | ○ | ○ |
| (5) Ring abrasion depth, μm | 1.7 | 1.9 | 1.2 | 1.1 | 2.3 | 2.8 | 1.2 |
| (6) Contacting material abrasion depth, μm | 1.1 | 1.0 | 0.8 | 0.9 | 1.4 | 1.9 | 0.8 |
| Judgement | ○ | ○ | ○ | ○ | ○ | ○ | ○ |
| (7) Adhesive force, N | 2810 | 2680 | 3540 | 1320 | 3960 | 4270 | 1330 |
| Judgement | ○ | ○ | ○ | ○ | ○ | ○ | ○ |
| Overall Judgement | ○ | ○ | ○ | ○ | ○ | ○ | ○ |

Fig. 10

| Item | Comparative Examples | | | | | | | |
|---|---|---|---|---|---|---|---|---|
| | 1 | 2 | 3 | 4 | 5 | 6 | 7 | 8 |
| (1) Presence or absence of ion elution | × | × | ○ | ○ | ○ | ○ | ○ | ○ |
| Judgement | | | | | | | | |
| (2) Volume resistance, Ω·cm | $1.9 \times 10^2$ | $2.0 \times 10^2$ | $1.1 \times 10^1$ | $9.0 \times 10^0$ | $1.1 \times 10^1$ | $1.0 \times 10^1$ | $1.2 \times 10^1$ | $1.1 \times 10^1$ |
| Judgement | ○ | ○ | ○ | ○ | ○ | ○ | ○ | ○ |
| (3) Oil resistance (decreasing rate of pull strength, %) | 6.1 | 6.3 | 7.2 | 6.9 | 7.2 | 7.0 | 7.1 | 3.2 |
| Judgement | ○ | ○ | ○ | ○ | ○ | ○ | ○ | ○ |
| (4) Extension, % | 4.0 | 3.9 | 5.0 | 4.8 | 4.5 | 4.6 | 4.5 | 2.4 |
| Judgement | ○ | ○ | ○ | ○ | ○ | ○ | ○ | × |
| (5) Ring abrasion depth, μm | 2.7 | 2.6 | 2.0 | 2.1 | 2.3 | 2.3 | 2.6 | 2.9 |
| (6) Contacting material abrasion depth, μm | 1.5 | 1.6 | 1.1 | 1.1 | 1.3 | 1.4 | 1.4 | 1.9 |
| Judgement | ○ | ○ | ○ | ○ | ○ | ○ | ○ | ○ |
| (7) Adhesive force, N | 2810 | 2560 | 590 | 660 | 810 | 780 | 700 | 6250 |
| Judgement | ○ | ○ | × | × | × | × | × | ○ |
| Overall Judgement | × | × | × | × | × | × | × | × |

Fig. 11

| Name | Epoxy value meq/g | Examples, vol% ||||||
|---|---|---|---|---|---|---|---|
| | | 8 | 9 | 10 | 11 | 12 | 13 |
| Linear PPS | | 70 | 60 | 60 | 55 | 55 | 55 |
| Carbon fiber | | 20 | 20 | 20 | 20 | 20 | 20 |
| PTFE | | 5 | 5 | 5 | 5 | 5 | 5 |
| Epoxy compound No. 1 | 0.42 | | 15 | | | | |
| Epoxy compound No. 2 | 0.57 | | | 15 | | | |
| Epoxy compound No. 3 | 0.84 | | | | 20 | | |
| Epoxy compound No. 4 | 1.34 | | | | | 20 | |
| Epoxy compound No. 5 | 4.65 | 5 | | | | | 20 |

Fig. 12

| Name | Epoxy value meq/g | Comparative Examples, vol% | | | | | | |
|---|---|---|---|---|---|---|---|---|
| | | 9 | 10 | 11 | 12 | 13 | 14 | 15 |
| Linear PPS | | 100 | 70 | 70 | 70 | 70 | 60 | 60 |
| Carbon fiber | | | 20 | 20 | 20 | 20 | 20 | 20 |
| PTFE | | | 5 | 5 | 5 | 5 | 5 | 5 |
| Epoxy compound No. 1 | 0.42 | | 5 | | | | | |
| Epoxy compound No. 2 | 0.57 | | | 5 | | | | |
| Epoxy compound No. 3 | 0.84 | | | | 5 | | | |
| Epoxy compound No. 4 | 1.34 | | | | | 5 | 15 | |
| Epoxy compound No. 5 | 4.65 | | | | | | | 15 |

Fig. 13

| Name | Epoxy value meq/g | Comparative Examples, vol% | | | | | | | |
|---|---|---|---|---|---|---|---|---|---|
| | | 16 | 17 | 18 | 19 | 20 | 21 | 22 | 23 |
| Linear PPS | | 60 | 55 | 55 | 50 | 50 | 50 | 50 | 50 |
| Carbon fiber | | 20 | 20 | 20 | 20 | 20 | 20 | 20 | 20 |
| PTFE | | 5 | 5 | 5 | 5 | 5 | 5 | 5 | 5 |
| Epoxy compound No. 1 | 0.42 | | 20 | | | | | | |
| Epoxy compound No. 2 | 0.57 | | | | 25 | | | | |
| Epoxy compound No. 3 | 0.84 | | | | | 25 | | | |
| Epoxy compound No. 4 | 1.34 | | | | | | 25 | 25 | |
| Epoxy compound No. 5 | 4.65 | 15 | | 20 | | | | | 25 |

Fig. 14

| Item | Examples | | | | | |
|---|---|---|---|---|---|---|
| | 8 | 9 | 10 | 11 | 12 | 13 |
| Amount of epoxy groups, meq/100g | 19.16 | 8.47 | 13.56 | 8.16 | 11.46 | 18.32 |
| (1)Presence or absence of ion elution | ○ | ○ | ○ | ○ | ○ | ○ |
| Judgement | | | | | | |
| (2)Volume resistance, $\Omega \cdot cm$ | $4.2 \times 10^2$ | $4.0 \times 10^2$ | $3.9 \times 10^2$ | $1.0 \times 10^3$ | $1.6 \times 10^3$ | $1.1 \times 10^3$ |
| Judgement | ○ | ○ | ○ | ○ | ○ | ○ |
| (3)Oil resistance (decreasing rate of pull strength, %) | 4.0 | 4.6 | 4.2 | 5.1 | 5.4 | 6.0 |
| Judgement | ○ | ○ | ○ | ○ | ○ | ○ |
| (4)Ring abrasion depth, $\mu m$ | 2.8 | 2.6 | 2.4 | 2.3 | 2.1 | 2.3 |
| (5)Contacting material abrasion depth, $\mu m$ | 0.5 | 1.1 | 1.3 | 0.8 | 1.0 | 0.7 |
| Judgement | ○ | ○ | ○ | ○ | ○ | ○ |
| (6)Adhesive force, N | 1170 | 1040 | 1420 | 1060 | 1370 | 1270 |
| Judgement | ○ | ○ | ○ | ○ | ○ | ○ |
| Overall Judgement | ○ | ○ | ○ | ○ | ○ | ○ |

Fig. 15

| Item | Comparative Examples | | | | | | |
|---|---|---|---|---|---|---|---|
| | 9 | 10 | 11 | 12 | 13 | 14 | 15 |
| Amount of epoxy groups, meq/100g | 0.00 | 1.36 | 1.97 | 2.74 | 4.40 | 4.19 | 6.05 |
| (1)Presence or absence of ion elution | ○ | ○ | ○ | ○ | ○ | ○ | ○ |
| Judgement | | | | | | | |
| (2)Volume resistance, $\Omega \cdot cm$ | $1.1 \times 10^2$ | $1.7 \times 10^2$ | $1.5 \times 10^2$ | $1.5 \times 10^2$ | $2.1 \times 10^2$ | $2.9 \times 10^2$ | $4.6 \times 10^2$ |
| Judgement | ○ | ○ | ○ | ○ | ○ | ○ | ○ |
| (3)Oil resistance (decreasing rate of pull strength, %) | 1.9 | 4.1 | 4.3 | 4.4 | 4.2 | 4.8 | 4.7 |
| Judgement | ○ | ○ | ○ | ○ | ○ | ○ | ○ |
| (4)Ring abrasion depth, $\mu m$ | 3.3 | 1.2 | 1.4 | 1.2 | 1.9 | 2.4 | 2.6 |
| (5)Contacting material abrasion depth, $\mu m$ | 0.3 | 1.5 | 1.4 | 1.5 | 1.2 | 1.0 | 1.1 |
| Judgement | × | ○ | ○ | ○ | ○ | ○ | ○ |
| (6)Adhesive force, N | 80 | 200 | 320 | 420 | 720 | 640 | 880 |
| Judgement | × | × | × | × | × | × | × |
| Overall Judgement | × | × | × | × | × | × | × |

Fig. 16

| Items | Comparative Examples | | | | | | | |
|---|---|---|---|---|---|---|---|---|
| | 16 | 17 | 18 | 19 | 20 | 21 | 22 | 23 |
| Amount of epoxy groups, meq/100g | 57.99 | 5.68 | 77.70 | 7.20 | 10.33 | 14.53 | 23.22 | 97.60 |
| (1) Presence or absence of leached ions | ○ | ○ | ○ | ○ | ○ | ○ | ○ | ○ |
| Judgement | ○ | ○ | ○ | ○ | ○ | ○ | ○ | ○ |
| (2) Volume resistance, $\Omega \cdot cm$ | $4.0 \times 10^2$ | $2.0 \times 10^3$ | $2.2 \times 10^3$ | $5.0 \times 10^3$ | $4.5 \times 10^3$ | $5.2 \times 10^3$ | $4.8 \times 10^3$ | $5.5 \times 10^3$ |
| Judgement | ○ | ○ | ○ | ○ | ○ | ○ | ○ | ○ |
| (3) Oil resistance (decreasing rate of pull strength, %) | 4.5 | 5.3 | 5.0 | 8.7 | 7.4 | 8.1 | 8.3 | 9.6 |
| Judgement | ○ | ○ | ○ | ○ | ○ | ○ | ○ | ○ |
| (4) Ring abrasion depth, $\mu m$ | 2.4 | 2.8 | 2.4 | 3.2 | 3.5 | 3.3 | 3.2 | 3.9 |
| (5) Contacting material abrasion depth, $\mu m$ | 1.3 | 1.0 | 0.6 | 0.8 | 0.7 | 0.9 | 1.0 | 0.7 |
| Judgement | ○ | × | ○ | × | × | × | × | × |
| (6) Adhesive force, N | 520 | 750 | 450 | 940 | 1200 | 1470 | 960 | 410 |
| Judgement | × | × | × | × | ○ | ○ | × | × |
| Overall Judgement | × | × | × | × | × | × | × | × |

HOUSING FOR FLUID LUBRICATION BEARING APPARATUSES

CROSS-REFERENCE TO RELATED APPLICATIONS

This is a 371 of International Application No. PCT/JP2006/307650, filed on Apr. 11, 2006, which claims the benefit of priority from the prior Japanese Patent Application Nos. 2005-151608, filed on May 24, 2005 and 2005-151609 filed on May 24, 2005, the entire contents of which are incorporated herein by references.

BACKGROUND OF THE INVENTION (1) Field of the Invention

The present invention relates to a housing for fluid lubrication bearing apparatuses. Bearing apparatuses having this housing are suitable for information appliances, for example, in spindle motors for magnetic disk drive units such as HDD, optical disk drive units such as CD-ROM, CD-R/RW, DVD-ROM/RAM, magneto-optic disk drive units such as MD and MO, polygon scanner motors of laser beam printers (LBP), collar wheels of projectors, or electrical machinery and apparatuses, for example, small motors such as fan motors.

(2) Description of the Related Art

Enhanced speed, cost reduction, noise reduction, etc., as well as high rotational accuracy, are required for the above various kinds of motors. One of the components which determine these required performance is a bearing which supports spindles of said motors. In recent years, the use of a fluid lubrication bearing having excellent characteristics for the above required performance has been considered or actually used.

Fluid lubrication bearings of this type are roughly classified into: hydrodynamic bearings comprising a hydrodynamic pressure producing part for producing hydrodynamic pressure in a lubricating fluid within a bearing gap; and so-called cylindrical bearings (bearings having a bearing cross section in a perfect circle shape) without a hydrodynamic pressure producing part.

For example, in a fluid lubrication bearing apparatus integrated into a spindle motor of HDD and like disk drive units, a radial bearing portion which supports a shaft member constituting a rotational member in the radial direction and a thrust bearing portion which supports the shaft member in the thrust direction are both sometimes constituted by hydrodynamic bearings. An example of known radial bearing portions in fluid lubrication bearing apparatuses (hydrodynamic bearing apparatuses) of this type is such that hydrodynamic grooves are formed as a hydrodynamic pressure producing part on either the inner periphery face of a bearing sleeve or the outer circumferential surface of a shaft member opposing this and a radial bearing gap is formed between both faces. (For example, refer to Japanese Unexamined Patent Publication No. 2003-239951).

The above fluid lubrication bearing apparatus is constituted of a housing, bearing sleeve, shaft member and other parts. To ensure high rotational performance required for the increasingly high performance of information appliances, efforts to improve the dimensional accuracy and assembly precision of each part have been made. In contrast, with the trend of a decrease in the prices of information appliances, a demand for cost reduction in this type of bearing apparatuses is increasing. In response to these requirements, recently, forming a housing, a component part of a fluid lubrication bearing apparatus, of a resin material has been examined (for example, refer to Japanese Unexamined Patent Publication No. 2003-314534).

When fluid lubrication bearing apparatuses comprising these housings are integrated into and used in spindle motors for HDD and like magnetic disk apparatuses mentioned above, mounting of the fluid lubrication bearing apparatus onto a motor is normally carried out by adhesively fixing the outer circumferential surface of the housing on the inner periphery face of a motor bracket with an adhesive. However, when a resin forming the housing has poor adhesiveness, an adhesion surface is peeled by the impact caused by a drop of an information appliance integrating a magnetic disk apparatus, which may result in lowered function of the bearing apparatus and therefore of the magnetic disk apparatus. Particularly recently, in response to an increase in required disk capacities, the number of magnetic disks integrated into the above disk apparatus tends to increase. This further increases the impact force caused when dropped. Therefore, even higher adhesive force is required between a housing of this type and a motor bracket.

There are known means for improving the adhesiveness of a resin, for example, a method of adding a monoepoxy compound to a polyphenylene sulfide (PPS) resin (for example, refer to Japanese Unexamined Patent Publication No. H1-65171), or a method of adding a PPS resin modified with epoxy groups to an unmodified PPS resin (for example, refer to Japanese Unexamined Patent Publication No. H8-85759) and the like.

BRIEF SUMMARY OF THE INVENTION

However, forming the above housing of resins obtained by the methods stated above may cause the following problems. For example, in the former method (adding monoepoxy resin), to increase the affinity of the resin and adhesive, there arises a necessity to add a substantial amount of epoxy resin. This may lower the fluidity (melt viscosity) of the whole resin and may adversely affect the moldability of the housing. Moreover, in the latter method (adding epoxy modified PPS), a low-molecular-weight epoxy component remaining in the epoxy modified PPS decomposes at the molding temperature of the housing, producing a gas. This gas remaining inside the molding leaves voids within the housing, remains on the outer surface of the housing, or causes other problems, which may lower the molding precision of the housing. Moreover, to obtain an epoxy modified resin of this type, complicated and numerous steps need to be carried out, which results in an increase in required production costs. From the foregoing, none of the above-mentioned methods can be said to be an appropriate means for improving the adhesive force of a housing for fluid lubrication bearing apparatuses.

An object of the present invention is to provide a housing for fluid lubrication bearing apparatuses which has an improved adhesiveness with other components at low costs.

To achieve the above object, the present invention provides a housing for fluid lubrication bearing apparatuses which has a radial bearing gap within itself and a adhesion fixing face with other components on its outer periphery, the housing for fluid lubrication bearing apparatuses being formed of a resin composition comprising polyphenylene sulfide (PPS) as a base resin, and the amount of the base resin contained in the resin composition being not less than 40 vol % but not higher than 70 vol %.

As mentioned above, in the present invention, the base resin is added so that the amount of the base resin contained in the resin composition forming the housing is not less than 40 vol % but not higher than 70 vol %, more preferably not less than 50 vol % but not less than 70 vol %. According to this, the adhesiveness (affinity for adhesives) of the housing made of a resin can be increased without additionally using epoxy resins or like resins having high adhesiveness. Therefore, adhesive strength with other components (motor bracket, etc.) can be improved without adversely affecting the moldability of the housing itself. This enables dealing with the requirements for increased disk capacities of disk apparatuses.

Herein, the compounding ratio of the base resin in the resin composition is set to the above range for the following reasons. That is, if the compounding ratio is more than 70 vol %, the amount of the base resin in the resin composition becomes too high, and therefore the adhesive force with other components is lowered, which may prevent obtaining practical performance. Moreover, if the compounding ratio of the base resin is lower than 40 vol %, the components other than the base resin (filler, etc.) is relatively increased, whereby the melt viscosity of the resin composition is increased and the moldability of the housing may be adversely affected. Alternatively, it is because the shortage of the base resin in the resin composition may greatly lower the mechanical characteristics, especially impact resistant characteristics and elongation characteristics of the housing.

Moreover, in the present invention, polyphenylene sulfide (PPS) is selected as the base resin for the above housing. Since this resin is a crystalline resin having a high degree of crystallization, it has strong interaction between its molecular chains, and it hardly permits an ester-based lubricating oil having low viscosity to swell itself. Accordingly, forming the housing of these resin materials based on the resin, high oil resistance can be imparted to the housing, regardless of the type of the lubricating oil. Moreover, since the above resin material has especially high fluidity in a molten state among crystalline resins, the moldability of such a housing can be ensured to readily deal with the size reduction of the housing. Furthermore, the above resin material has the advantage that it produces little outgas. Therefore, by forming the housing of the above resin material, the amount of the outgas produced during molding of the housing or after molding can be reduced and the cleanliness of the bearing apparatus or disk apparatus can be maintained at a high level.

As mentioned above, using polyphenylene sulfide (PPS) as the base resin in an amount of not less than 40 vol % but not more than 70 vol % can enable obtaining a housing having both physical characteristics (oil resistance, low outgassing property, high fluidity in molding, etc.) that the above base resin (PPS) originally has and high adhesiveness with other components (motor bracket, etc.), which has been never realized.

The inventors of the present invention has found that adding a compound containing an epoxy group (epoxy compound) to the base resin is effective in improving adhesiveness, and among epoxy compounds, adding an epoxy compound containing two or more epoxy groups per molecule of the compound greatly improves adhesiveness, Based on the findings, in the present invention, a housing is formed of a resin composition having the constitution described below.

That is, the above housing is formed of a resin composition prepared by adding an epoxy compound having two or more epoxy groups per molecule of the compound and an epoxy value of 0.5 meq/g or higher to polyphenylene sulfide (PPS) which serves as a base resin so that the amount of the epoxy groups in the resin composition is 8 meq/100 g or more.

As mentioned above, the above epoxy compound is added so that the amount of the epoxy groups (density of epoxy groups) in the resin composition is 8 meq/100 g or higher, whereby the affinity (adhesiveness) of a housing formed of such a resin composition for adhesives can be further increased. Accordingly, the adhesive strength with another components (motor bracket, etc.) to which the housing is to be adhered can be further improved, enabling to readily deal with the requirements for increased disk capacities of disk apparatuses. Moreover, selecting a compound having an epoxy value of 0.5 meq/g or higher as the above epoxy compound added to the resin composition, the amount of the epoxy compound added relative to polyphenylene sulfide (PPS) in the resin composition can be suppressed. In other words, the amount of polyphenylene sulfide (PPS) added can be set as high as possible. Therefore, high fluidity (moldability) during molding of the resin composition is ensured, while the adhesiveness with other components (motor bracket, etc.) can be increased at low costs.

The amount of epoxy groups in the resin composition is preferably 20 meq/100 g or less. By suppressing the amount of epoxy groups in the resin composition within the above range, for example, the amount of gas produced during injection molding can be limited and the dimensional errors, defective appearance and other problems of a molded article which can result from a large amount of gas remaining within the mold can be overcome.

The amount of the epoxy compound added to the resin composition is preferably 20 vol % or less. High oil resistance and good moldability (high fluidity) that PPS originally has can be sufficiently manifested by suppressing the amount of the epoxy compound added to fall within the above range. In particular, high abrasion resistance that PPS has and the like are sometimes diminished by increasing the amount of the epoxy compound added. By suppressing the added amount to fall within the above range, however, such problem can be overcome and high abrasion resistance can be imparted to the housing.

As the above epoxy compound, for example, compounds in which a polyolefin main chain and a glycidyl methacrylate (GMA) side chain are grafted, or bisphenol A (BPA) epoxy compound can be preferably used.

The resin composition containing the above polyphenylene sulfide (PPS) and epoxy compound contains Na in an amount of preferably 2000 ppm or less. According to this, a by-product of polyphenylene sulfide (PPS), NaCl, etc., are reduced, and therefore, for example, Na contained in polyphenylene sulfide (PPS) is also reduced. Therefore, the amount of Na ions leaching out into the lubricating oil is suppressed, and the cleanliness inside or outside the bearing can be thus maintained at a high level. To limit the amount of Na contained in polyphenylene sulfide (PPS) to fall within the above numerical value range (2000 ppm or less), for example, a solvent having a high relative dielectric constant (at least 10) may be used to conduct cleaning. Moreover, Na in the molecular terminal group can be removed by cleaning with an acid, whereby the amount of Na contained can be reduced to a greater extent. Specifically, among polyphenylene sulfide (PPS), linear polyphenylene sulfide (PPS) having the least number of side chains is preferred in terms of its small number of molecular terminal groups per unit volume and an small amount of Na contained.

With the recent popularity of portable electronic appliances, high strength and impact resistant characteristics are required for a housing for fluid lubrication bearing apparatuses in parts other than those to be adhered to other components, as well as the required characteristics stated above.

Moreover, when the housing forms a thrust bearing gap between itself and a rotational member, from a perspective of maintaining the bearing gap highly accurately, high dimensional stability is required. Hence in the present invention, a carbon fiber is added as a filler to the resin composition containing polyphenylene sulfide (PPS) and epoxy compound. This increases the strength of the housing and allows the low-heat dimensional variability of the carbon fiber to manifest, suppressing a dimensional change in the resin part associated with a change in temperature. As a result, the thrust bearing gap is highly accurately controlled during use and high bearing performance can be produced. Moreover, since carbon fibers have electric conductivity, their addition to the resin composition as fillers can impart high electric conductivity to the housing. This allows the static charge on the rotational member (for example, disk hub, etc.) side caused during use to be dissipated to a member on the ground side via the housing.

To satisfy the above required characteristics, a carbon fiber having tensile strength of 3000 MPa or higher is preferred. Examples of such carbon fibers which have high electric conductivity as well as high strength are PAN-based (polyacrylonitrile-based) carbon fibers.

The strengthening effect, dimension stabilizing effect, electrostatic removal effect and other effects produced by adding these carbon fibers to the resin composition are exerted more noticeably by considering the aspect ratios of the carbon fibers. That is, the longer the fiber length of the carbon fiber, the higher the strengthening effect and electrostatic removal effect, while the smaller the fiber diameter, the less the damage of the abrasion resistance, especially of a sliding contacting material. From these perspectives, it is specifically preferred that the aspect ratio of the carbon fiber is 6.5 or more.

The amount of the carbon fiber added to the base resin as a filler is preferably 10 to 35%. This is because when the added amount is, for example, less than 10 vol %, the strengthening effect and electrostatic removal effect produced by adding the carbon fiber is not sufficiently exerted, and when the added amount is more than 35 vol %, it becomes hard to ensure the moldability of the housing.

As mentioned above, the resin composition forming the housing can be constituted of the above base resin and carbon fiber, while in order to increase the mold release characteristics, the electric conductivity and other characteristics of the housing, in addition to the above base resin and the carbon fiber, additives such as resins other than PPS and rubber component, etc., are separately added to constituted the resin composition thereof. In any of the above cases, Although there is no particular problems when the amounts of the base resin and the carbon fiber contained in the resin composition each falls within the above range, but when it is difficult to cause the compounding ratio of the above compositions to fall within the above range with only themselves, there arises a need to add (charge) materials for adjusting the compounding ratio additionally. Materials to be added at this time need to be such that do not diminish the effects imparted to the housing by the above base resin and carbon fiber.

In view of this point, the inventors of the present invention have found an inorganic compound, especially an inorganic compound with substantially no ionic elution as the material mentioned above. That is, an inorganic compound is added so that it makes up the remainder of the base resin and carbon fiber in the resin composition, or the remainder of the base resin and carbon fiber and additives in the resin composition, whereby the problem stated above can be overcome. Therefore, a housing which reaps the benefits produced by adding the above base resin (PPS) and carbon fiber can be obtained. Moreover, among inorganic compounds, an inorganic compound with substantially no ionic elution is especially preferred. An inorganic compound of this type can avoid modification, deterioration and lowered viscosity of the lubricating oil, and therefore the bearing performance can be maintained at a high level. Alternatively, the event that the ions deposit on the bearing apparatus and its surroundings can be avoided, whereby the cleanliness of the inner bearing or the surroundings of the bearing apparatus can be ensured.

Specific examples of inorganic compounds which satisfy the above conditions include an aluminum borate compounds, titanium oxide, zinc oxide and the like. Among these, in particular aluminum borate compounds can be more preferably used. Moreover, there are fibrous and powdery forms of these inorganic compounds. Considering the strengthening effect of the housing, fibrous, especially whisker form is preferred.

A housing for fluid lubrication bearing apparatuses of the above constitution can be suitably provided as a fluid lubrication bearing apparatus comprising this housing, a bearing sleeve fixed on the inner periphery of the housing, and a rotational member having a shaft. In this case, a radial bearing gap is formed inside of the housing, and between the inner periphery face of the bearing sleeve and the outer circumferential surface of the shaft opposing this. Of course, the radial bearing gap can be directly formed between the inner circumferential surface of the housing and the outer circumferential surface of the shaft opposing this.

Moreover, the above fluid lubrication bearing apparatus can be suitably provided as a motor comprising this fluid lubrication bearing apparatus, a fixing member as a different component which adhesively fixes on an adhesion fixing face of the housing and fixes the fluid lubrication bearing apparatus on its inner periphery, a stator coil, and a rotor magnet which produces excitation between itself and the stator coil.

As mentioned above, according to the present invention, a housing for fluid lubrication bearing apparatuses having both high adhesiveness with other components and high moldability can be provided at low costs.

BRIEF DESCRIPTION OF SEVERAL VIEWS OF THE DRAWING

FIG. 7 shows the ratios of constituent materials of Example 1.

FIG. 8 shows the ratios of constituent materials of Example 1.

FIG. 9 shows the comparison test results of Example 1.

FIG. 10 shows the comparison test results of Example 1.

FIG. 11 shows the ratios of constituent materials of Example 2.

FIG. 12 shows the ratios of constituent materials of Example 2.

FIG. 13 shows the ratios of constituent materials of Example 2.

FIG. 14 shows the comparison test results of Example 2.
FIG. 15 shows the comparison test results of Example 2.
FIG. 16 shows the comparison test results of Example 2.

DETAILED DESCRIPTION OF THE INVENTION

One embodiment of the present invention will be described below with reference to FIGS. 1 to 4.

Figure 1:
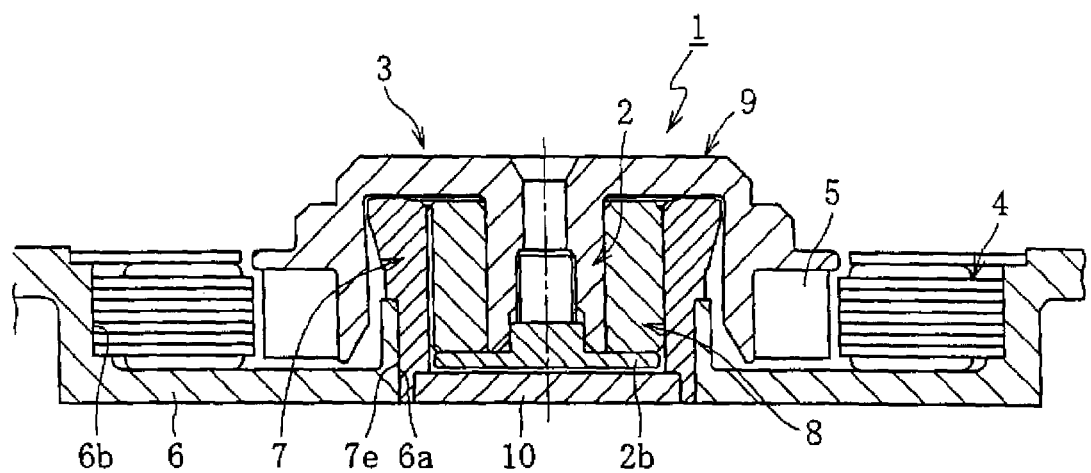
FIG. 1 is a cross-sectional view of a spindle motor integrating a fluid lubrication bearing apparatus according to one embodiment of the present invention.

FIG. 1 conceptually shows one constitutional example of a spindle motor for information appliances integrating a fluid lubrication bearing apparatus 1 according to one embodiment of the present invention. This spindle motor is used for HDD and like disk drive units, and comprises the fluid lubrication bearing apparatus 1 which rotatably supports a rotational member 3 comprising a shaft 2 in a non-contact manner, a stator coil 4 and rotor magnet 5 which, for example, oppose each other across a gap in the radial direction, and a motor bracket (fixing member) 6. The stator coil 4 is attached to the outer diameter side of the motor bracket 6, and the rotor magnet 5 is attached to the outer periphery of the rotational member 3. The housing 7 of the fluid lubrication bearing apparatus 1 is fixed on the inner periphery of the motor bracket 6. Although not shown in the Fig., one or more magnetic disks or like disk-shaped information recording media (hereinafter simply referred to as disks.) are retained on the rotational member 3. In the thus constituted spindle motor, when the stator coil 4 is energized, the excitation produced between the stator coil 4 and rotor magnet 5 rotates the rotor magnet 5, which causes the disks retained on the rotational member 3 to rotate together with the shaft 2.

Figure 2:
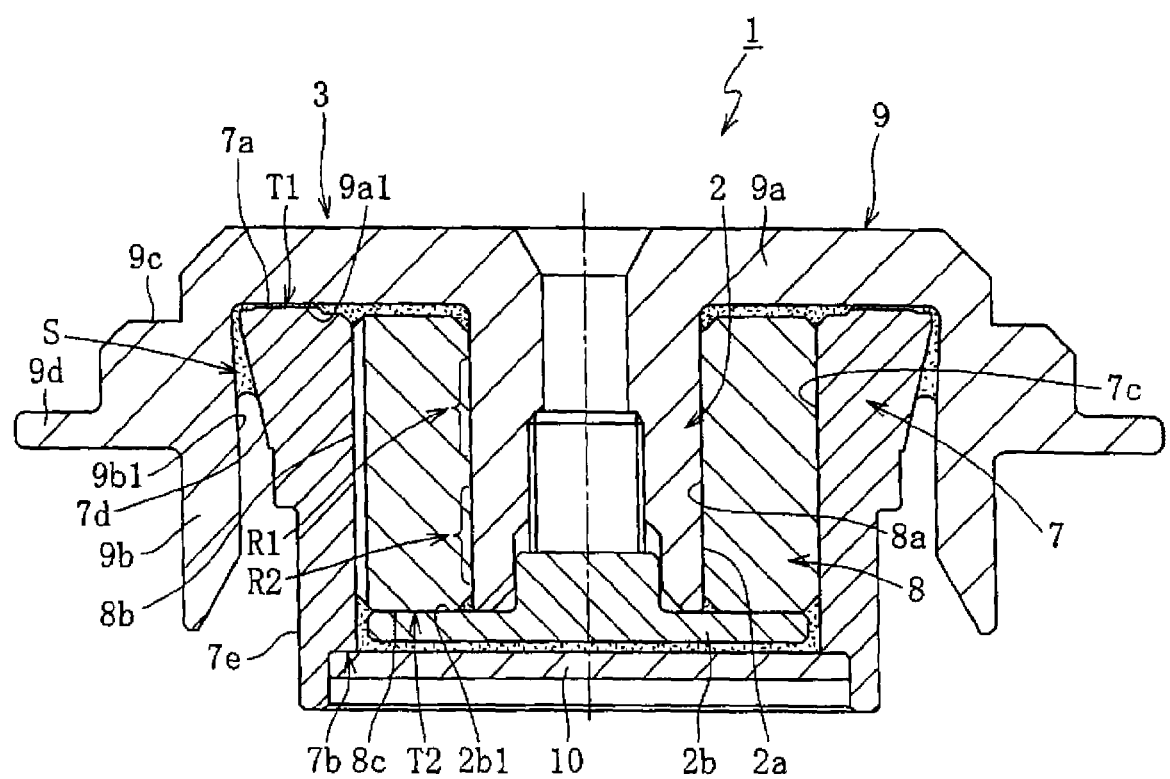
FIG. 2 is a cross-sectional view of the fluid lubrication bearing apparatus.

FIG. 2 shows the fluid lubrication bearing apparatus 1. This fluid lubrication bearing apparatus 1 mainly comprises a housing 7, a bearing sleeve 8 fixed on the housing 7, the rotational member 3 which rotates relative to the housing 7 and bearing sleeve 8. It should be noted that for the sake of explanation, of opening portions of the housing 7 formed at both axial ends, the side which is sealed with a lid member 10 is referred to as the lower side, and the side opposite to the sealed side is referred to as the upper side in the description below.

The rotational member 3 comprises, for example, a hub portion 9 disposed on the opening side of the housing 7, and the shaft 2 inserted at the inner periphery of the bearing sleeve 8.

The hub portion 9 is formed of a metallic material or a resin material, and is constituted of a disk portion 9a covering the opening side (upper side) of the housing 7, a cylindrical portion 9b extending downwardly in the axial direction from the outer circumference of the disk portion 9a, a disk loading face 9c and a brim 9d provided on the outer periphery of the cylindrical portion 9b. The unshown disks are fitted onto the outer periphery of the disk portion 9a, and are mounted on the disk loading face 9c. The disks are retained on the hub portion 9 by an unshown appropriate retaining means (damper, etc.).

The shaft 2 in this embodiment is formed integrally with the hub portion 9, and separately comprises a flange portion 2b as a pull out prevention at its lower end. The flange portion 2b is made of a metal, and is, for example, fixed on the shaft 2 by screw connection or like means.

The bearing sleeve 8 can be formed, for example, of brass and like copper alloys and aluminum alloy and like metallic materials, or can be formed of a porous body made of a sintered metal. In this embodiment, it is formed of a porous body of a sintered metal comprising copper as a main ingredient in a cylindrical shape.

Figure 3:
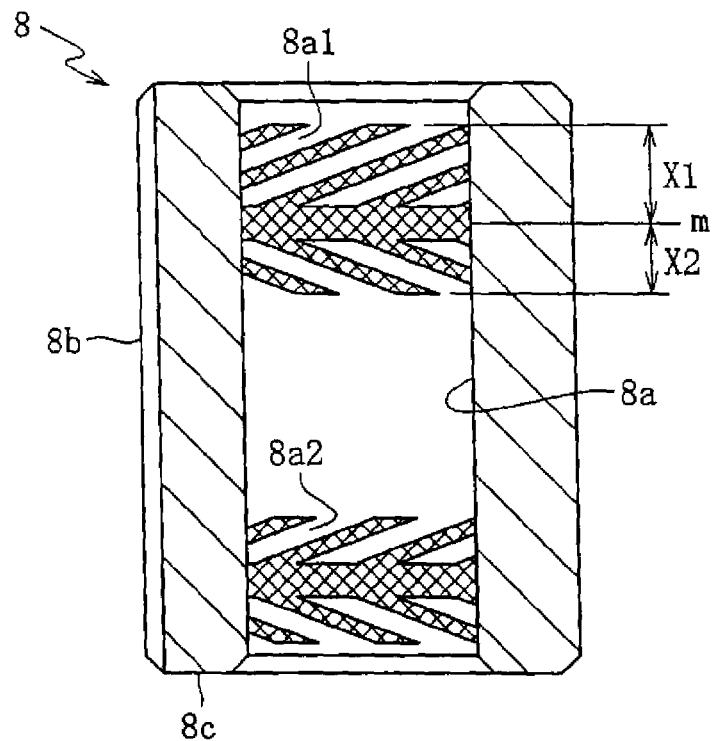
FIG. 3 is a cross-sectional view of the bearing sleeve.

In the cylindrical region on the entire inner circumferential surface 8a of the bearing sleeve 8 or a part thereof, a region in which a plurality of hydrodynamic grooves arranged in a predetermined shape is formed as a radial hydrodynamic pressure producing part. In this embodiment, for example, as shown in FIG. 3, a region in which a plurality of hydrodynamic grooves $8a1$, $8a2$ arranged in a herringbone shape is formed in axially separate two positions. In the region in which the upper hydrodynamic groove $8a1$ is formed, the hydrodynamic groove $8a1$ is formed axially asymmetrically relative to the axial center m (the axial center of the region between the upper and lower slanted grooves), and the axial dimension X1 of the region above the axial center m is greater than the axial dimension X2 of the region therebelow.

In an annular region on the entire lower end face 8c of the bearing sleeve 8 or a part thereof, for example, although not shown in the Fig., a region in which a plurality of hydrodynamic grooves arranged in a spiral shape is formed as a thrust hydrodynamic pressure producing part. This region in which the hydrodynamic grooves are formed opposes the upper end face $2b1$ of the flange portion 2b as a thrust bearing face, and forms a thrust bearing gap of a second thrust bearing portion T2 between itself and the upper end face $2b1$ while the shaft 2 (rotational member 3) is in rotation (refer to FIG. 2).

Figure 4:
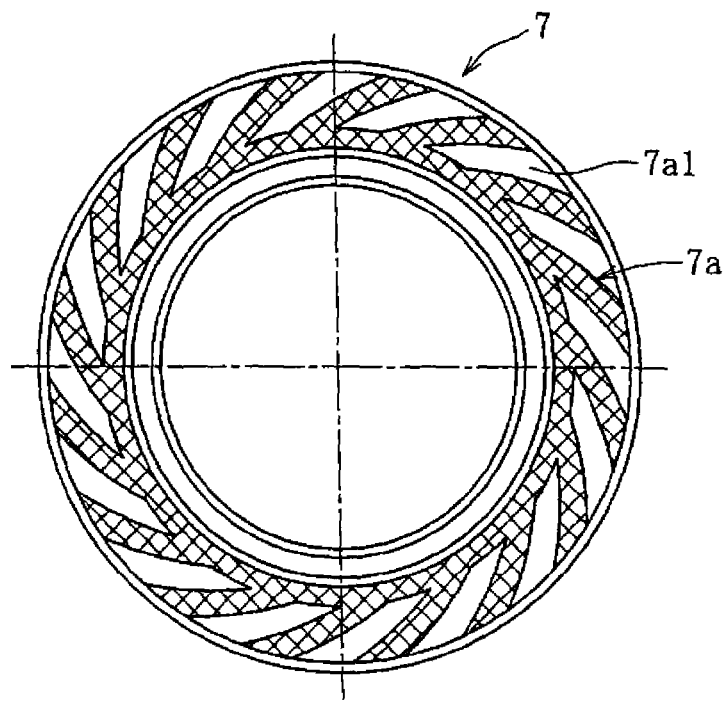
FIG. 4 is an upper end face drawing of the housing.

The housing 7 is formed of a resin material in a cylindrical shape. In this embodiment, the housing 7 has such a shape that its both axial ends are open, and the other end side is sealed with the lid member 10. An annular region on the entire end face (upper end face) on one end side or a part thereof is provided with a thrust bearing face 7a. In this embodiment, for example, as shown in FIG. 4, a region in which a plurality of hydrodynamic grooves $7a1$ are arranged in a spiral shape on the thrust bearing face 7a is formed as a thrust hydrodynamic pressure producing part. This thrust bearing face 7a (region in which the hydrodynamic grooves $7a1$ are formed) opposes the lower end face $9a1$ of the disk portion 9a of the hub portion 9, and forms the thrust bearing gap of a first thrust bearing portion T1 described later between itself and the lower end face $9a1$ while the rotational member 3 is in rotation (refer to FIG. 2).

The lid member 10 sealing the other end side of the housing 7 is formed of a metallic material or a resin material, and is fixed on a shoulder 7b provided on the inner periphery side at the other end of the housing 7. Herein, the fixing means is not particularly limited. For example, adhesion (including loose adhesion, press fitting adhesion), press fitting, deposition (for example, ultrasonic deposition), welding (for example, laser welding) and like means can be suitably selected depending on the combination of materials and required mounting strength, sealing performance and the like.

The outer circumferential surface 8b of the bearing sleeve 8 is fixed on the inner circumferential surface 7c of the housing 7 by, for example, adhesion (including loose adhesion and press fitting adhesion), press fitting, deposition or like suitable means.

A tapering sealing face 7d whose diameter gradually increases to the top is formed on the outer periphery of the housing 7. This tapering sealing face 7d forms an annular sealing space S whose radial dimension gradually decreases from the sealed side (lower side) of the housing 7 towards the opening side (upper side) between itself and the inner circumferential surface $9b1$ of the cylindrical portion 9b. While the shaft 2 and hub portion 9 are in rotation, this sealing space S is in communication with the outer diameter side of the thrust bearing gap of the first thrust bearing portion T1.

An adhesion fixing face 7e is formed at the lower end of the outer periphery of the housing 7. The adhesion fixing face 7e in this embodiment forms a cylindrical shape with an constant diameter, and is adhesively fixed on the inner circumferential surface 6a of the motor bracket 6. Accordingly, the fluid lubrication bearing apparatus 1 is integrated into the motor.

The inside of the fluid lubrication bearing apparatus 1 is filled with a lubricating oil, and the oil level of the lubricating oil is always maintained within the sealing space S. As the lubricating oil, various substances are usable. Especially a lubricating oil provided for a fluid lubrication bearing apparatus for HDD and like disk drive units are required to have a low evaporation rate and low viscosity. For example, dioctyl sebacate (DOS), dioctyl azelate (DOZ) and like ester-based lubricating oils are suitable.

High oil resistance (low oil absorbing property) to the above ester-based lubricating oil is required for the above housing 7, and in addition to this, the amount of the outgas produced and the water absorbed during use need to be suppressed at low levels. Moreover, considering a change in temperature in a used atmosphere and transport atmosphere, etc., high heat resistance is also required.

An example of a resin satisfying the above required characteristics is polyphenylene sulfide (PPS). Since polyphenylene sulfide (PPS) is economically available compared to other resins and is an resin excellent in fluidity (melt viscosity) during molding, it is suitable as a base resin for the housing 7.

By the way, polyphenylene sulfide (PPS) is generally produced by the polycondensation reaction of sodium sulfide and paradichlorobenzene, and it also contains a by-product, sodium chloride. Accordingly, polyphenylene sulfide (PPS) needs to be cleaned by using an appropriate solvent. A solvent for cleaning may be any solvent that has a relative dielectric constant of at least 10 or more, preferably 20 or more, more preferably 50 or more. Further considering the environmental aspect, for example, water (relative dielectric constant: about 80) is preferable, and ultrapure water is especially preferable. Na mainly at the polyphenylene sulfide (PPS) terminal group is removed by conducting cleaning with by such a solvent. This enables reducing the amount of Na contained polyphenylene sulfide (PPS) (for example, 2000 ppm or lower), making polyphenylene sulfide (PPS) usable as a resin material for forming the housing 7. Moreover, removing Na of the terminal group has the advantage of increasing the crystallization rate.

Polyphenylene sulfides (PPS) are roughly classified into: crosslinked polyphenylene sulfide (PPS); semi-linear polyphenylene sulfide (PPS) with a small number of side chains; and linear polyphenylene sulfide (PPS) with an even smaller number of side chains. Among these, linear polyphenylene sulfides (PPS) with a small number of side chains are more preferably in that it has a smaller number of molecular terminal groups per molecule and less amount of Na contained. Moreover, linear polyphenylene sulfide (PPS) is a preferable material also in that cleaning is easier compared to other types of polyphenylene sulfides (PPS), or the amount of Na contained almost need not be reduced by cleaning. Specifically, those which contain Na in an amount of 2000 ppm or less, more preferably 1000 ppm, even more preferably 500 ppm or less fall under the above-mentioned linear polyphenylene sulfide (PPS). According to this, the amount of Na ions leached out into the lubricating oil can be suppressed, and therefore the surfaces of the fluid lubrication bearing apparatus 1 and the disks retained on the rotational member 3 or the disk head (not shown) can be prevented from Na deposition.

The above base resin is added to the resin composition so that the amount of the base resin contained is not less than 40 vol % but not more than 70 vol %, more preferably not less than 50 vol % but not more than 70 vol %. This allows obtaining the housing 7 whose oil resistance, lower outgassing property that the above base resin (PPS) originally has and adhesive force between the adhesion fixing face 7e and the inner circumferential surface 6a of the motor bracket 6 are improved, while high fluidity (low melt viscosity) during molding is sufficiently manifested. Moreover, by adding the base resin (PPS) within the above range, for example, when the bearing sleeve 8 or the lid member 10 is fixed by press fitting (including the case where press fitting and adhesion are used in combination), a required press fitting stock can be ensured in the housing 7, and it becomes possible to impart elongation to such an extent that does not cause cracks or like damages to the housing 7 itself.

In this embodiment, an epoxy compound having two or more epoxy groups per molecule of the compound and epoxy value of 0.5 meq/g or higher is added to the resin composition containing the above base resin so that the epoxy compound has the amount of epoxy groups in the resin composition of 8 meq/100 g or more. This enables obtaining the housing 7 whose oil resistance and low outgassing property that the above base resin (PPS) originally has and adhesiveness (adhesive strength) with the motor bracket 6 are further improved, while high fluidity (low melt viscosity) during molding is sufficiently manifested.

Moreover, the above epoxy compound is preferably added to the base resin so that the amount of epoxy groups in the resin composition is 20 meq/100 g or less. This is because if the amount of epoxy groups in the resin composition is more than the above range (20 meq/100 g), during molding of the housing 7, nonnegligible amount of gas is produced from the resin composition, and this gas remaining within the molding may cause dimensional errors, defective appearance and other problems of the housing 7 as a molded article.

It should be noted that from a perspective of inhibiting the production of gas during the molding mentioned above, in this embodiment, when polyphenylene sulfide (PPS) is used as the base resin, polyphenylene sulfide (epoxy unmodified PPS) not modified by an epoxy compound is preferably used. This is because when an epoxy modified PPS is used as the base resin, a low-molecular-weight epoxy component remaining in this epoxy modified PPS decomposes at the molding temperature of the housing 7 (herein, the temperature in injection of the epoxy modified PPS), producing gas. This gas remaining in the molding stays as void holes within the housing 7, or stays on the outer surface of the housing 7, whereby the molding precision of this housing 7 may be lowered.

As the epoxy compound, any such compound having an epoxy value within the above range may be used. Among them, an epoxy compound in which a polyolefin main chain and glycidyl methacrylate (GMA) side chains are grafted, or bisphenol A epoxy compound can be suitably used. It should be noted that there are also known examples of the above example epoxy compounds, such as the copolymer type having only glycidyl methacrylate (GMA) as the side chains, as well as those terpolymerized by further causing styrene or the like not containing epoxy groups as the side chains to graft. However, as mentioned above, copolymer types in which only a compound containing an epoxy group are grafted as side chains are desirably used rather than terpolymers using styrene or the like in terms of heat resistance.

The thrust bearing face 7a provided on the upper end face of the housing 7 produces sliding friction between itself and the lower end face 9a1 of the hub portion 9, which oppose each other in the axial direction, when the rotational member 3 starts and stops. The sliding abrasion of the housing 7 of this type can be reduced by appropriately setting the compounding ratio of the epoxy compound relative to the base resin, specifically to 20 vol % or less.

Carbon fibers can be added as fillers to the resin composition containing the above base resin and epoxy compound. According to this, the housing 7 is strengthened, while a dimensional change associated with a change in the temperature of the housing 7 can be suppressed and high dimensional stability can be obtained. As a result, the thrust bearing gap of the first thrust bearing portion T1 during use can be highly accurately controlled. Moreover, the high electric conductivity of the carbon fibers are manifested by adding the carbon fibers to the base resin, enabling to impart sufficient electric conductivity (for example, volume resistance: $1.0 \times 10^6$ Ω·cm or lower) to the housing 7. This allows the static electricity charging the disks during use to be dissipated to a ground side member (motor bracket 6, etc.) via the rotational member 3 and housing 7 (and also sometimes the bearing sleeve 8).

Examples of usable carbon fibers include those based on PAN, based on Pich and various others. From the perspective of the strengthening effect and impact absorption, those which have relatively high tensile strength (preferably 3000 MPa or higher) are preferred, and in particular, PAN-based carbon fibers are preferred as those which also have high electric conductivity.

As this PAN-BASED carbon fiber, those which fall within the dimension range described below can be used.

(1) When a molten resin is kneaded to be injection-formed, the carbon fibers are cut into short fibers. If short fibers increase to a certain degree, strength, electric conductivity and other properties are greatly lowered, and therefore satisfying these required characteristics becomes difficult. Therefore, relatively long fibers are preferably used as carbon fibers to be added to the resin anticipating the breakage of fibers during molding. Specifically, carbon fibers having an average fiber length of 100 μm or longer (more preferably 1 mm or longer) are desirably used.

(2) In contrast, in the injection molding step, the resin cured within the mold is removed; this resin is fused again; and it is kneaded together with a virgin resin composition for reuse (recycled use) in some cases. In this case, a part of the fibers are repeatedly recycled. Therefore, if the initial fiber length is too long, the fibers become greatly shorter than the initial fiber length due to cutting as they are recycled, and changes in the characteristics of the resin composition (lowered melt viscosity, etc.) becomes noticeable. To minimize such changes in characteristics, it is preferable that the fiber length is as short as possible. Specifically, it is desirable that the average fiber length is 500 μm or shorter (preferably 300 μm or shorter).

The choice of the fiber length of the carbon fibers mentioned above can be determined depending on the history of the usage of the resin composition. For example, when a virgin resin composition is used singly or in combination with a recycled resin composition, and when the ratio of the virgin resin composition is high, from the perspective of inhibiting lowered strength, electric conductivity, etc., carbon fibers within the dimension range mentioned in the above (1) are preferably used. On the other hand, the ratio of the recycled resin composition used is high, from the perspective of inhibiting changes in the characteristics of the resin composition due to recycling, carbon fibers within the dimension range mentioned in the above (2) are desirably used.

It should be noted that for both carbon fibers (1) and (2), the smaller the fiber diameter of the carbon fiber, the more the number of the fibers contained, which is effective for uniformizing the product quality, and the greater the aspect ratio thereof, the higher the strengthening effect by fiber strengthening. Therefore, the aspect ratio of the carbon fiber is desirably as high as possible, specifically 6.5 or higher is preferred. Moreover, the suitable average fiber diameter of the carbon fiber is 5 to 20 μm considering workability and availability.

In order to sufficiently manifest the strengthening effect and electrostatic removal effect, etc., by the carbon fibers stated above, the amount of the carbon fibers to be added to the base resin is preferably 10 to 35 vol %, more preferably 15 to 25 vol %. This is because when the amount of the carbon fibers added is less than 10 vol %, the strengthening effect and electrostatic removal effect by the carbon fibers are not manifested sufficiently and the abrasion resistance of the housing 7 in the sliding portion with the hub portion 9, especially the abrasion resistance of the hub portion 9 which serves as a sliding contacting material is not ensured, while the moldability of the housing 7 is lowered when the added amount is more than 35 vol %, making obtaining high dimensional accuracy difficult.

In order to improve the mold release characteristics and electric conductivity of the housing 7, various additives can be added to the base resin (PPS) containing the above carbon fibers in such a range that the effects stated above are not prevented, or in such a range that substantially no ions mentioned later are found to leach out. Organic and inorganic additives may be used. For example, organic substances such as non-PPS crystalline resins, amorphous resins, rubber components, etc., and inorganic substances such as carbon black, metal fibers, glass fibers, etc., can be used. More specific examples that can be added include polytetrafluoroethylene (PTFE) as a mold releasing agent having excellent oil resistance, and furnace black and carbon black as conductive agents.

Inorganic compounds can be further added to the resin composition containing the above base resin and carbon fibers, or the above base resin and carbon fibers and the above additives. In this case, the amount of an inorganic compound to be added is preferably selected so that it makes up the remainder of the base resin and carbon fiber, or the remainder of the base resin and carbon fibers and additives in the resin composition. Accordingly, the amounts of the base resin and the carbon fibers contained in the resin composition can be each suitably adjusted to falls within the above range.

Various substances are usable as the inorganic compound. Among them, inorganic compounds with substantially no ionic elution are especially preferred. In an inorganic compound of this type, ions can be prevented from leaching out from the lubricating oil and the bearing performance can be maintained at a high level. Alternatively, the aforementioned event that the ions are deposited on the bearing apparatus and its surroundings can be avoided, and the cleanliness inside the bearing or around the bearing apparatus can be ensured.

Specific examples of inorganic compounds which meet the above conditions include aluminum borate compounds, titanium oxide, zinc oxide and the like. Among these, in particular aluminum borate compounds can be more suitably used. There are fibrous and powdery forms of these inorganic compounds. Among these, considering the strengthening effect of the housing, fibrous, especially whisker-shaped ones are preferable, and powders are preferred considering the moldability of the housing (resin chargability).

The melt viscosity of the resin composition prepared by adding the carbon fibers and inorganic compounds to the above base resin is preferably suppressed to 500 Pa·s or lower at 310° C. and at the shear rate of $1000$ $s^{-1}$ since the inside of the cavity is highly accurately filled with a molten resin. Therefore, the melt viscosity of the resin composition excluding the carbon fibers (base resin and epoxy compound) is preferably 100 Pa·s or lower at 310° C. and at a shear rate of 1000 s$^{-1}$ to compensate an increase in the viscosity caused by adding the carbon fibers and inorganic compounds.

As mentioned above, forming the housing 7 of the resin composition stated above allows the housing to have all of high oil resistance, low outgassing property, high fluidity during molding, low water absorbing property, high heat resistance, and high adhesive force with the motor bracket 6. This can increase the durability and reliability of the fluid lubrication bearing apparatus 1 and the disk drive unit integrating this bearing apparatus. Furthermore, the housing 7 which has excellent mechanical strength, impact resistance, moldability, dimensional stability, electrostatic removal property can be obtained by adding the carbon fibers in an appropriate amount depending on the application. Moreover, the amounts of the above base resin and the carbon fibers added can be optionally adjusted by adding the inorganic compounds, if necessary, whereby the housing 7 which has the above characteristics in an optimum balance can be obtained.

The housing 7 as a finished product can be used regardless of its size, but since an improvement in the above moldability can be expected, and the housing 7 having a smaller size (for example, during injection molding, the charged portion of the resin is 1 mm or smaller at the minimum) can be molded. Because of this, the fluid lubrication bearing apparatus (hydrodynamic bearing apparatus) 1 comprising this housing 7 and therefore a spindle motor for disk drive units integrating this can be reduced in size and suitably used.

In the fluid lubrication bearing apparatus 1 of the above constitution, while the shaft 2 (rotational member 3) is in rotation, a region (region in which the hydrodynamic grooves 8a1, 8a2 in two upper and lower positions are formed) which serves as the radial bearing face of the inner circumferential surface 8a of the bearing sleeve 8 opposes the outer circumferential surface 2a of the shaft 2 across the radial bearing gap. In response to the rotation of the shaft 2, the lubricating oil in the above radial bearing gap is pushed towards the side of the axial center m of the hydrodynamic grooves 8a1, 8a2 and the pressure is increased. A first radial bearing portion R1 and second radial bearing portion R2 which support the shaft 2 in the radial direction in a non-contact manner are constituted by such hydrodynamic effect of the hydrodynamic grooves 8a1, 8a2, respectively.

Simultaneously, in the thrust bearing gap between the thrust bearing face 7a of the housing 7 (region in which a hydrodynamic groove 7a1 is formed) and the lower end face 9a1 of the hub portion 9 (disk portion 9a) opposing this, and in the thrust bearing gap between the lower end face 8c (region in which the hydrodynamic grooves are formed) and the upper end face 2b1 of a flange portion 2b opposing this, oil films of the lubricating oil are formed, respectively, by the hydrodynamic effect of the hydrodynamic grooves. The first thrust bearing portion T1 and second thrust bearing portion T2 which support the rotational member 3 in the thrust direction in a non-contact manner are constituted by the pressure of these oil films.

One embodiment of the present invention has been described above, but the fluid lubrication bearing apparatus according to the present invention is not limited to this embodiment and can have other constitutions. Another constitutional example of the fluid lubrication bearing apparatus will be described below. It should be noted that in the drawings shown below, the parts and components having the same constitution and function as in one embodiment are referred to by identical reference numerals, and their repeated explanation is dispensed with.

In the case described in the above embodiment, the thrust bearing face 7a on which a plurality of hydrodynamic grooves 7a1 are arranged on the upper end face of the housing 7 (first thrust bearing portion T1) is provided, and the thrust bearing face on which a plurality of hydrodynamic grooves are arranged on the lower end face 8c of the bearing sleeve 8 is provided (second thrust bearing portion T2). However, the present invention can be similarly applied to a fluid lubrication bearing apparatus provided only with the first thrust bearing portion T1. In this case, the shaft 2 is in a straight shape not having the flange portion 2b. Therefore, the housing 7 can be in the form of a bottomed cylinder by forming the lid member 10 integrally of the resin material as the bottom. Moreover, the shaft 2 and hub portion 9 can be molded of a metal or a resin, while the shaft 2 can be formed separately from the hub portion 9. In this case, the shaft 2 is made of a metal, and using this shaft 2 made of a metal as an insert, the rotational member 3 can be molded of a resin integrally with the hub portion 9.

Figure 5:
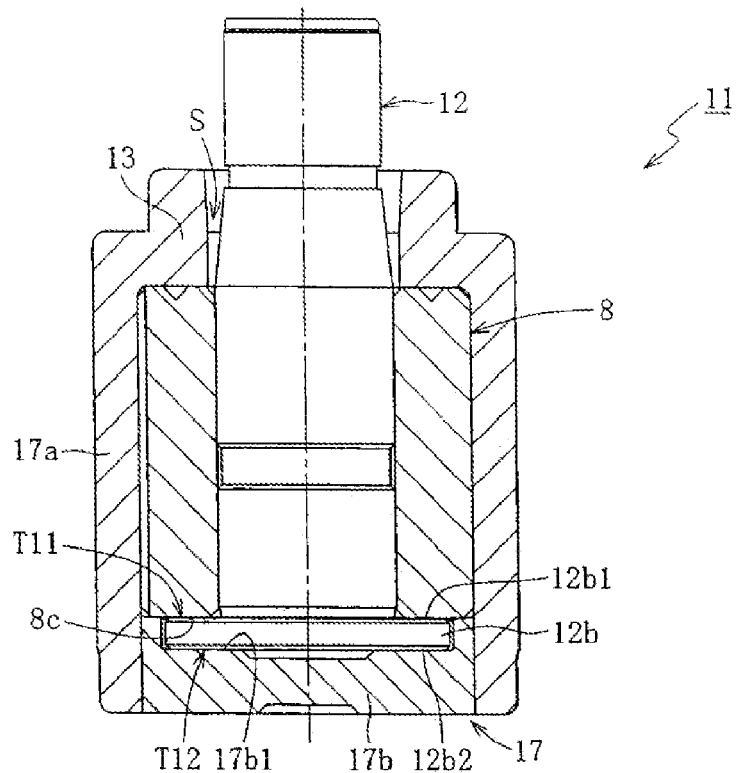
FIG. 5 is a cross-sectional view showing another constitution of the fluid lubrication bearing apparatus.

FIG. 5 shows another constitutional example of the fluid lubrication bearing apparatus 1. In the fluid lubrication bearing apparatus 11 shown in the same Fig., the shaft member 12 comprises a flange portion 12b provided integrally or separately at its lower end. Moreover, the housing 17 comprises a cylindrical side portion 17a and a bottom 17b which is structured separately from the cylindrical side portion 17a and positioned at a lower end portion of the side portion 17a. A sealing portion 13 protruding towards the inner periphery side is formed at an upper end portion of the side portion 17a of the housing 17 integrally with the housing 17. Although not shown in the Fig., for example, a region in which a plurality of hydrodynamic grooves are spirally arranged is formed on the upper end face 17b1 on the bottom 17b of the housing 17. Furthermore, while the shaft member 12 is in rotation, a first thrust bearing portion T11 is formed between the lower end face 8c of the bearing sleeve 8 and the upper end face 12b1 of the flange portion 12b of the shaft member 12, and a second thrust bearing portion T12 is formed between the upper end face 17b1 on the bottom 17b of the housing 17 and of the lower end face 12b2 of the flange portion 12b.

In this constitutional example, the side portion 17a of the housing 17 is formed of a resin material together with the sealing portion 13. Accordingly, as a material for forming this housing 17, a resin composition having the same chemical composition as in the above embodiment is selected so that the housing 17 which is excellent in the adhesive force with the motor bracket (not shown in the Fig), oil resistance, abrasion resistance, cleanliness, dimensional stability, moldability, elongation characteristics and the like can be obtained. Moreover, when the bottom 17b is formed of a resin material, it can be at a material ratio similar to that of the housing 17. This can further improve the adhesive force between the housing 17 and bottom 17b.

Figure 6:
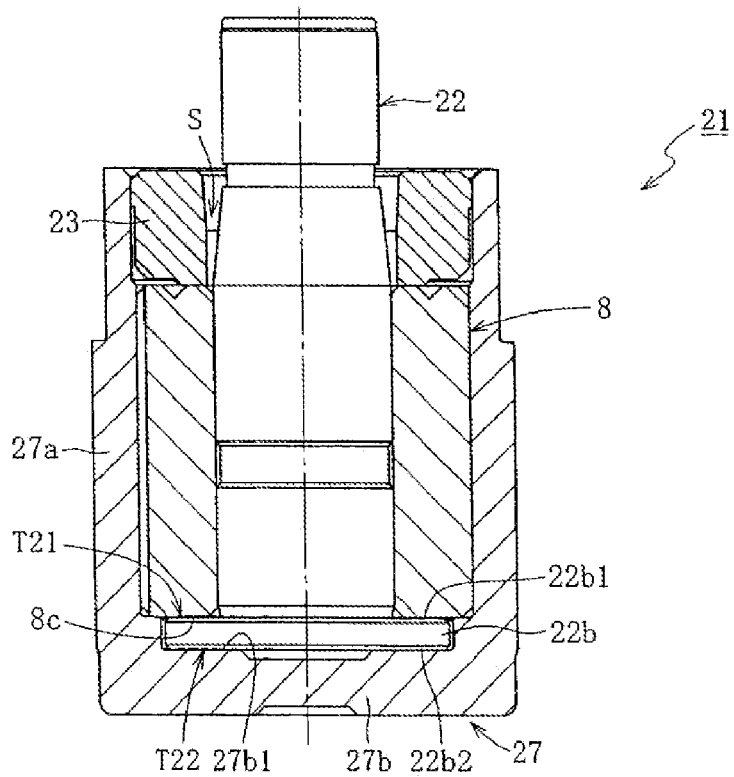
FIG. 6 is a cross-sectional view showing another constitution of the fluid lubrication bearing apparatus.

FIG. 6 shows another constitutional example of the fluid lubrication bearing apparatus 11. In a fluid lubrication bearing apparatus 21 in the same Fig., a sealing portion 23 is formed separately from the side portion 27a of a housing 27, and is fixed by means of adhesion, press fitting, deposition or the like on the inner periphery of an upper end portion of the housing 27. Moreover, the bottom 27b of the housing 27 is molded of a resin material integrally with the side portion 27a of the housing 27, and has a bottomed cylindrical form. It should be noted that the constitutions other than this are based on the constitution of the fluid lubrication bearing apparatus 11 shown in FIG. 5 and therefore their description is dispensed with.

In this constitutional example, the housing 27 is formed of a resin material integrally with the side portion 27a of the bottom 27b. Accordingly, as a material for forming the housing 27, the housing 27 which is excellent in the adhesive force with the motor bracket (not shown in the Fig.), oil resistance, abrasion resistance, cleanliness, dimensional stability, moldability, elongation characteristics and the like can be obtained by selecting a resin composition having the same chemical composition as in the above embodiment.

In the above embodiment, the case where the housing 7 and the bearing sleeve 8 contained inside the inner periphery of the housing 7 are separate is described, but these housing 7 and bearing sleeve 8 can be integral (also in the cases of the housings 17 and 27). In this case, the integral member of the bearing sleeve 8 and housing 7 is formed of a resin composition having the above chemical composition comprising PPS as a base resin. Moreover, the hydrodynamic pressure producing part stated above is provided on the side of the integral sleeve-housing member (fixed side), or it can be provided on the side of the shaft 2 and flange portion 2b opposing these or of the hub portion 9 (rotation side).

In the constitutional example above, the constitution of the radial bearing portions R1, R2 and the thrust bearing portions T1, T2 in which the hydrodynamic effect of the lubricating fluid is produced by hydrodynamic grooves arranged in a herringbone shape or a spiral shape are shown for example, but the present invention is not limited to this.

For example, as the radial bearing portions R1, R2 may be employed, although not shown in the Fig., a so-called step hydrodynamic pressure producing part in which grooves in the axial direction are formed at a plurality of positions in the circumferential direction, or a so-called multirobe bearing in which a plurality of arcuate faces are arranged in the circumferential direction and a wedge-shaped radial gap (bearing gap) is formed between the arcuate faces and the outer circumferential surface 2a of the opposing shaft 2 (or shaft member 12).

Alternatively, the inner circumferential surface 8a of the bearing sleeve 8 which serves as a radial bearing face is made a perfectly circular inner circumferential surface not comprising hydrodynamic grooves as a hydrodynamic pressure producing part, arcuate faces or the like, and a so-called cylindrical bearing can be constituted of the inner circumferential surface and the perfectly circular outer circumferential surface 2a of the shaft 2 opposing this inner periphery face.

Moreover, either or both of the thrust bearing portions T1, T2 can be constituted of, although not shown in the Fig., a so-called step bearing in which a plurality of radial groove-shaped hydrodynamic grooves are provided in the region which serves as a thrust bearing face circumferentially at a predetermined intervals, or a wave-shaped bearing (the steps are here in a wavy shape herein) or the like.

EXAMPLE 1

To clarify the advantages of the present invention, a plurality of resin compositions having different chemical compositions were evaluated for the required characteristics of a housing for fluid lubrication bearing apparatuses. A certain polyphenylene sulfide (PPS) was used as a base resin. Moreover, a carbon fiber and six inorganic compounds having different main constituent elements or different shapes were used as fillers. The combination of these base resins and fillers (carbon fibers and inorganic compounds) and their compounding ratios are as shown in FIGS. 7 and 8.

It should be noted that in this Example, the following substances were used: LC-5G manufactured by Dainippon Ink And Chemicals, Incorporated as the linear polyphenylene sulfide (PPS) (The amount of Na contained: about 300 ppm), titanium oxide manufactured by Ishihara Sangyo Kaisha, Ltd. (grade: CR-60-2, main constituents: titanium oxide, average diameter: 0.2 μm), zinc oxide manufactured by The Honjyo Chemical Corporation (grade: No. 1, main constituents: zinc oxide, average diameter: 0.6 μm), "Alborite"_manufactured by Shikoku Chemicals Corporation (grade: FA08, main constituents: aluminum borate, average diameter: 8.0 μm, form: powder), Alborex manufactured by SHIKOKU CHEMICALS CORPORATION (grade: Y, main constituents: aluminum borate, average diameter: 0.5 to 1.0 μm, average fiber length: 10 to 30 μm, form: whisker), Tismo manufactured by Otsuka Chemical Co., Ltd. (grade: N, main constituent elements: potassium titanate, average diameter: 0.3 to 0.6 μm, average fiber length: 10 to 20 μm), Whiscal manufactured by Maruo Calcium Co., Ltd. (grade: A, main constituent elements: calcium carbonate, average diameter 0.5 to 1.0 μm, average fiber length: 20 to 30 μm) as the six inorganic compounds (inorganic compounds No.1 to No.6), respectively. Moreover, HM35-C6S manufactured by TORO TENAX Co., Ltd. (fiber diameter: 7 μm, average fiber length: 6 mm, tensile strength: 3240 MPa) was used as a carbon fiber (PAN-based). In addition, carbon black was added as an additive in this Example. Specifically, carbon black manufactured by Mitsubishi Chemical Corporation (grade: #3350B, average particle diameter: 24 nm) was used.

These raw materials were dry-blended according to the compounding ratios shown in FIGS. 7 and 8. The mixture was fed into a biaxial extruder (screw L/D ratio: about 30), fused and kneaded at a screw rotation speed of 150 rpm and at a temperature of 300 to 330° C. After kneading, a molten strand is drawn through a die having a diameter of 4 mm. The strand is then cooled, producing rise-sized pellets of the resin composition. It should be noted that in order to avoid the breakage of the carbon fibers during fusing and kneading as much as possible, the above blend was fed from the side feed portion of the biaxial shaft extruder at a predetermined speed.

Evaluation items are the following seven items of a test piece formed by using the above pellets: (1) non-leachability of ions, (2) volume resistance [Ω·cm], (3) oil resistance (decreasing rate of tensile strength) [%], (4) elongation [%], (5) ring abrasion depth [μm], (6) abrasion depth [μm] of the contacting material, and (7) adhesive force [N]. The evaluation method of each evaluation (method for measuring the value of each evaluation item), and the scale for judging whether it is acceptable or not are as shown below.

(1) Non-Leachability of Ions

The presence or absence of various kinds of ions leached out from the test piece (housing) was examined by using ion chromatography. The specific procedure is shown below.

(a) A test piece is formed by injection molding, and the surface of the test piece is sufficiently cleaned with ultrapure water in advance.

(b) Ultrapure water is poured into an empty beaker, and the above test piece is put into the ultrapure water.

(c) The above beaker is set in a thermostat heated to 80° C. for one hour, the ions contained in the surface and inside of the test piece are caused to leach out in ultrapure water. Meanwhile, a beaker into which only ultrapure water is poured and no test piece is placed is similarly set in a thermostat for one hour, and is used as a blank.

(d) The amount of ions contained the ultrapure water into which the test piece prepared above is placed is measured by ion chromatography (measured value A). Similarly, the amount of ions contained in the blank is separately measured (measured value B).

(e) The measured value B is deduced from the measured value A to confirm the present or absence of leaching ions.

It should be noted that as the scale for judging whether it is acceptable or not, ions which can be analyzed with a column generally used in ion chromatography (refer to Table 1 below) were used as those to be detected. It was determined to be acceptable if none of the ions listed in the Table was detected (◯), and unacceptable if any of the ions were detected (×).

TABLE 1

List of ions to be detected

| Cations | Anions |
|---------|--------|
| $Li^+$ $Mg^{2+}$ | $F^-$ $NO_3^-$ |
| $Na^+$ $Ca^{2+}$ | $Cl^-$ $PO_4^{3-}$ |
| $K^+$ $Sr^{2+}$ | $NO_2^-$ $SO_4^{2-}$ |
| $Rb^+$ $Ba^{2+}$ | $Br^-$ |
| $Cs+$ $NH_4^+$ | $SO_3^{2-}$ |

(2) Volume Resistance [Ω·cm]

Measurement was carried out by the four probe method according to JIS K7194. As the scale for judging whether it is acceptable or not, the amount of $1.0 \times 10^6$ Ω·cm or less was regarded as acceptable (◯), while that of more than $1.0 \times 10^6$ Ω·cm was regarded as unacceptable (×).

(3) Oil Resistance (Decreasing Rate of Tensile Strength) [%]

No. 1 dumbbell prescribed in JIS IC7113 was immersed in a lubricating oil in a thermostat at 120° C. for 1000 hours to then measure the tensile strength of the same. The decreasing rate of the tensile strength of the same from the tensile strength of the dumbbell at the start of the test was calculated (the dumbbell of the same number when immersed for 0 hours). A diester oil, di(2-ethylhexyl)azelate was used as the lubricating oil. Measurement of the tensile strength was carried out by the method prescribed in JIS K7113, and the decreasing rate was calculated by the following equation.

T0=the tensile strength as of the start of the test
When Tn=the tensile strength at each measurement time, Decreasing rate [%]={(T0−Tn)/T0}×100

As the scale for judging whether it is acceptable not, after 1000 hours, that which has the decreasing rate of 10% or lower was regarded as acceptable (◯), and that which has the rate of over 10% was regarded as unacceptable (×).

(4) Elongation [%]

A test piece of Type 1 dumbbell is formed according to ASTM D638 by injection molding. The elongation when it is pulled at the rate of pulling of 10 mm/min was measured. As the scale for judging whether it is acceptable not, the case where the breaking elongation is more than 3% was regarded as (◯), and the case where it is 3% or less was regarded as (×).

(5) Ring Abrasion Depth [μm] and
(6) Abrasion Depth [μm] of the Contacting Material Measurement was carried out in a ring-on-disk test which rotates the disk side in the state that an annular test piece is pushed against a disk-shaped contacting material in a lubricating oil with a predetermined load applied. Specifically, an annular resin molded product having the dimension of 21 mm (outer diameter)×17 mm (inner diameter)×3 mm (thickness) was used as a test piece. Moreover, a disk material made of SUS420 having a surface roughness Ra of 0.04 μm, diameter of 30 mm×thickness of 5 mm was used as a contacting material. A diester oil, di(2-ethylhexyl)azelate was used as the lubricating oil. The kinematic viscosity of this lubricating oil at 40° C. is 10.7 mm²/s. During the ring-on-disk test, the surface pressure of the contacting material to the test piece was 0.25 MPa; the rotation speed (peripheral speed) was 1.4 m/min; the test time was 14 hours; and the temperature of the oil was 80° C. As the scale for judging whether it is acceptable or not, the case where the ring abrasion depth was 3 μm or less was determined acceptable (◯), and the case where the depth was over 3 μm was regarded as unacceptable (×), As for the abrasion depth of the contacting material, the case where it was 2 μm or less was regarded as acceptable (◯), and the case where it was over 2 μm was regarded as unacceptable (×).

(7) Adhesive Force [N]

A cylindrical molded product <1> having a diameter of 10 mm and a height of 15 mm is formed by injection molding. Meanwhile, a motor bracket model fixture <2> was made having a dimension of 20 mm (diameter)×10 mm (diameter)× 10 mm by using aluminium (equivalent to A5056). At the central portion of this fixture, a hole whose inner diameter dimension is defined so that the diametrical gap (adhesion gap) between itself and the cylindrical molded product <1> is 25 μm is processed. The surfaces of the cylindrical molded product <1> and motor bracket model fixture <2> are sufficiently degreased. A primer is applied to the adhesion surface of the cylindrical molded product <1> (the surface of the above molded product <1>), and an anaerobic adhesive is applied to the adhesion surface of the motor bracket model fixture <2> (the surface of the fixture <2> facing the molded article <1> when the above molded product <1>) is inserted into the above fixture <2>). Thereafter, the molded product <1> is inserted into the fixture <2>, and is cured by heating at 90° C. for 1 hour. It should be noted that "TB1359D" and "TB1390F" both manufactured by Three Bond Co., Ltd. were used as the anaerobic adhesive and the primer, respectively. Moreover, the amount of the anaerobic adhesive applied was set to about 10 mg, and the amount of the primer applied was set to about 1 mg (measured as an increase in the weight of the molded product after a solvent content was volatilized).

The molded product <1> was then removed from the fixture <2>, and the maximum load applied at the time of removal was regarded as the adhesive force. As the scale for judging whether it is acceptable or not, the case where the adhesive force was over 1000 N was regarded as acceptable (◯), the case where it was 1000 N or lower was regarded as unacceptable (×).

In FIGS. 9 and 10, the evaluation results relating to the evaluation items (1) to (7) of each test piece are shown. As in Comparative Examples 3 to 7, if the ratio of the base resin contained in the resin composition is too high (higher than 70 vol %), sufficient adhesive force cannot be obtained. As in Comparative Examples 1 and 2, if ions leach out from the inorganic compound added, lowered bearing performance and cleanliness of the bearing apparatus cannot be avoided. Moreover, as in Comparative Example 8, if the ratio of the base resin added is too low (lower than 40 vol %), the physical characteristics that the base resin (PPS) should originally have, i.e., the amount of elongation herein, is reduced, and good press fitting with other components cannot be obtained. In contrast, in Examples 1 to 6 according to the present invention, excellent results were obtained in all aspects such as the adhesive force, abrasion resistance (abrasion depth of ring and contacting material), oil resistance (decreasing rate of tensile strength), cleanliness (presence or absence of ions), extensibility, electrostatic removability (volume resistance) and the like.

EXAMPLE 2

Moreover, to clarify the advantages of the present invention, a plurality of resin compositions with different chemical compositions were evaluated for the characteristics required for the housing 7. A linear polyphenylene sulfide (PPS) was used as the base resin. Moreover, four or five epoxy compounds having different epoxy values were each used as an epoxy compound added to the base resin. Moreover, a carbon fiber was used as the filler. The combinations and compounding ratios of these base resins and epoxy compounds are as shown in FIGS. 11 to 13.

It should be noted that in this Example, the followings were used: LC-5G manufactured by Dainippon Ink And Chemicals, Incorporated as the linear polyphenylene sulfide (PPS); and Bond-Fast manufactured by Sumitomo Chemical Co., Ltd. (grade: 2C, epoxy value: 0.42 meq/g), Rezeda manufactured by Toagosei Co., Ltd. (grade: GP301, epoxy value: 0.57 meq/g), Bond-Fast manufactured by Sumitomo Chemical Co., Ltd. (grade: E, epoxy value: 0.84 meq/g), Bond-Fast manufactured by Sumitomo Chemical Co., Ltd. (grade: CG5004, epoxy value: 1.34 meq/g), Epiclon manufactured by Dainippon Ink And Chemicals, Incorporated (grade: N-695P, epoxy value: 4.65 meq/g), as the five epoxy compounds (epoxy compounds No.1 to No.5), respectively. Moreover, HM35-C6S manufactured by Toho Tenax Co., Ltd. (fiber diameter: 7 μm, average fiber length: 6 mm, tensile strength: 3240 MPa) was used as the carbon fiber (PAN-based). Moreover, in this Example, polytetrafluoroethylene (PTFE) was added as a mold-releasing agent. Specifically, KTL-620 manufactured by Kitamura Ltd. was used.

These raw materials were dry-blended according to the compounding ratios shown in FIGS. 11 to 13. The mixture was fed into a biaxial extruder (screw L/D ratio: about 30), fused and kneaded at a screw rotation speed of 150 rpm and at a temperature of 300 to 330° C. After kneading, a molten strand is drawn through a die having a diameter of 4 mm. The strand is then cooled, producing rise-sized pellets of the resin composition. It should be noted that among the compositions shown in FIGS. 11 to 13, the compositions containing a carbon fiber are fed from the side feed portion of a biaxial extruder at a predetermined speed so that breakage of the carbon fibers during fusing and kneading are prevented.

Evaluation items are the following six items of a test piece formed by using the above pellets: (1) non-leachability of ions, (2) volume resistance [Ω·cm], (3) oil resistance (decreasing rate of tensile strength) [%], (4) ring abrasion depth [μm], (5) Abrasion depth of the sliding contacting material [μm], and (6) adhesive force [N]. The evaluation method of each evaluation (method for measuring the value of each evaluation item), and the scale for judging whether it is acceptable or not are as shown below. It should be noted that the amounts of epoxy groups in the resin compositions [meq/100 g] described in FIGS. 11 to 13 show the theoretical values of the amounts of epoxy groups contained in the test pieces formed as Examples and Comparative Examples, and are calculated by the following equation.

The amount of epoxy groups in the resin composition [meq/100 g]=the epoxy value [meq/g] of the epoxy compound added to said resin composition×the percentage of the epoxy compound [wt % (=g/100 g)]

(1) Non-Leachability of Ions

The presence or absence of various kinds of ions (including Na ions) leached out from the test piece (housing) was examined by using ion chromatography. The specific procedure is shown below.

(a) A test piece is formed by injection molding, and the surface of the test piece is sufficiently cleaned with ultrapure water in advance.

(b) Ultrapure water is poured into an empty beaker, and the above test piece is put into the ultrapure water.

(c) The above beaker is set in a thermostat heated to 80° C. for one hour, and the ions contained in the surface and inside of the test piece are caused to leach out into ultrapure water. Meanwhile, a beaker into which only ultrapure water is poured and no test piece is placed is similarly set in a thermostat for one hour, and is used as a blank.

(d) The amount of ions contained in the ultrapure water into which the test piece prepared above is placed is measured by ion chromatography (measured value A). Similarly, the amount of ions contained in the blank is separately measured (measured value B).

(e) The measured value B is subtracted from the measured value A to confirm the presence or absence of leaching ions.

It should be noted that as the scale for judging whether it is acceptable or not, ions which can be analyzed with a column generally used in ion chromatography (refer to Table 1 below) were used as those to be detected. It was regarded as acceptable if none of the ions listed in the Table was detected (○), and unacceptable if any of the ions were detected (×).

(2) Volume Resistance [Ω·cm]

Measurement was carried out by the four probe method according to JIS K7194. As the scale for judging whether it is acceptable or not, the amount of $1.0 \times 10^6$ Ω·cm or less was regarded as acceptable (○), while that of more than $1.0 \times 10^6$ Ω·cm was regarded as unacceptable (×).

(3) Oil Resistance (Decreasing Rate of Tensile Strength) [%]

No. 1 dumbbell prescribed in JIS K7113 was immersed in a lubricating oil in a thermostat at 120° C. for 1000 hours to then measure the tensile strength of the same. The decreasing rate of the tensile strength of the same from the tensile strength of the dumbbell at the start of the test was calculated. A diester oil, di(2-ethylhexyl)azelate was used as the lubricating oil. Measurement of the tensile strength was carried out by the method prescribed in JIS K7113, and the decreasing rate was calculated by the following equation.

[(Tensile strength at the start of the test)−(tensile strength at each measurement time)/(tensile strength at the start of the test)]×100[unit: %]

As the scale for judging whether it is acceptable not not, after 1000 hours, that which has the decreasing rate of 10% or lower was regarded as acceptable (○), and that which has the rate of over 10% was regarded as unacceptable (×).

(4) Ring Abrasion Depth [μm] and (5) Abrasion Depth of Sliding Contacting Material [μm]

Measurement was carried out in a ring-on-disk test which rotates the disk side in the state that an annular test piece is pushed against a disk-shaped contacting material in a lubricating oil with a predetermined load applied. Specifically, an annuler resin molded product having the dimension of 21 mm (outer diameter)×17 mm (inner diameter)×3 mm (thickness) was used as a test piece. Moreover, a disk material made of A5056 having a surface roughness Ra of 0.04 μm and the dimension of 30 mm (diameter)×5 mm (thickness) was used as the contacting material. A diester oil, di(2-ethylhexyl)azelate was used as the lubricating oil. The kinematic viscosity of this lubricating oil at 40° C. is 10.7 mm$^2$/s. During the ring-on-disk test, the surface pressure of the contacting material to the test piece was 0.25 MPa; the rotation speed (peripheral speed) was 1.4 m/min; the test time was 14 hours; and the temperatpure of the oil was 80° C. As the scale for judging whether it is acceptable or not, the case where the ring abrasion depth was 3 μm or less was determined acceptable (○), and the case where the depth was over 3 μm was regarded as unacceptable (×). As for the abrasion depth of the contacting material, the case where it was 2 µm or less was regarded as acceptable (○), and the case where it was over 2 µm was regarded as unacceptable (×).

(6) Adhesive Force [N]

A cylindrical molded product <1> having a diameter of 10 mm and a height of 15 mm is formed by injection molding. Meanwhile, a motor bracket model fixture <2> having a dimension of 20 mm (diameter)×10 mm (diameter)×10 mm was made by using aluminium (equivalent to A5056), In a center portion of this fixture, a hole whose inner diameter dimension is defined so that the diametrical gap (adhesion gap) between itself and the cylindrical molded product <1> is 25 µm is processed.

The surfaces of the cylindrical molded product <1> and motor bracket model fixture <2> are sufficiently degreased. A primer is applied to the adhesion surface of the cylindrical molded product <1> (the surface of the above molded product <1>), and an anaerobic adhesive is applied to the adhesion surface of the motor bracket model fixture <2> (the surface of the fixture <2> facing the molded article <1> when the above molded product <1>) is inserted into the above fixture <2>). Thereafter, the molded product <1> is inserted into the fixture <2>, and is cured by heating at 90° C. for 1 hour. It should be noted that "TB1359D" and "TB1390F" both manufactured by Three Bond Co., Ltd. were used as the anaerobic adhesive and the primer, respectively. Moreover, the amount of the anaerobic adhesive applied was set to about 10 mg, and the amount of the primer applied was set to about 1 mg (measured as an increase in the weight of the molded product after a solvent content was volatilized).

The molded product <1> was then removed from the fixture <2>, and the maximum load applied at the time of removal was regarded as the adhesive force. As the scale for judging whether it is acceptable or not, the case where the adhesive force is 1000 N or higher was regarded as acceptable (○), the case where it was less than 1000 N was regarded as unacceptable (×).

In FIGS. 14 to 16, the evaluation results relating to the evaluation items (1) to (6) of each test piece are shown. As in Comparative Examples 9 to 19, 22 and 23, if the epoxy value of the epoxy compound used is too low, or the amount of epoxy groups used in the resin composition is too small or too much, sufficient adhesive force (<1000 N) cannot be obtained. As in Comparative Examples 19 to 23, the amount of the epoxy compound added is too much relative to the base resin (PPS), the physical characteristics which the base resin (PPS) originally should have, that is, abrasion resistance herein, is lowered, and therefore sufficient durability for the sliding friction cannot be obtained. In contrast, in Examples 8 to 13 according to the present invention, better results were obtained in all aspect such as adhesive force, abrasion resistance (abrasion depth of ring and contacting material), oil resistance (decreasing rate of tensile strength), cleanliness (non-leachability of ions), electrostatic removability (volume resistance) and the like than in Comparative Examples.

The invention claimed is:

1. A housing for fluid lubrication bearing apparatuses which has a radial bearing gap within itself and an adhesion fixing face with other components on its outer periphery,
the housing being formed of a resin composition comprising polyphenylene sulfide (PPS) as a base resin, the amount of the base resin contained in the resin composition being not less than 40 vol % but not more than 70 vol %,
wherein the resin composition is prepared by adding an epoxy compound having two or more epoxy groups per molecule of the compound and an epoxy value of 0.5 meq/g or more to the base resin so that the amount of epoxy groups in the resin composition is 8 meq/100 g or more.

2. A housing for fluid lubrication bearing apparatuses according to claim 1, wherein the amount of epoxy groups in the resin composition is 20 meq/100 g or less.

3. A housing for fluid lubrication bearing apparatuses according to claim 1, wherein the amount of the epoxy compound added to the resin composition is 20 vol % or less.

4. A housing for fluid lubrication bearing apparatuses according to claim 1, wherein an epoxy compound in which a polyolefin main chain and glycidyl methacrylate (GMA) side chains are grafted is added to the base resin.

5. A housing for fluid lubrication bearing apparatuses according to claim 1, wherein a bisphenol A epoxy compound is added to the base resin.

6. A housing for fluid lubrication bearing apparatuses according to claim 1, wherein a resin composition contains Na in an amount of 2000 ppm or lower.

7. A housing for fluid lubrication bearing apparatuses according to claim 1, wherein said polyphenylene sulfide (PPS) is linear.

8. A housing for fluid lubrication bearing apparatuses according to claim 1, wherein a carbon fiber is contained in the resin composition.

9. A housing for fluid lubrication bearing apparatuses according to claim 8, wherein the tensile strength of the carbon fiber is 3000 MPa or higher.

10. A housing for fluid lubrication bearing apparatuses according to claim 8, wherein the carbon fiber is a PAN-based fiber.

11. A housing for fluid lubrication bearing apparatuses according to claim 8, wherein the aspect ratio of the carbon fiber is 6.5 or higher.

12. A housing for fluid lubrication bearing apparatuses according to claim 1, wherein a carbon fiber is contained in the resin composition in an amount of not less than 10 vol % but not more than 35 vol %.

13. A housing for fluid lubrication bearing apparatuses according to claim 12, wherein an inorganic compound is further contained in the resin composition.

14. A housing for fluid lubrication bearing apparatuses according to claim 13, wherein the inorganic compound is an aluminum borate whisker.

15. A fluid lubrication bearing apparatus comprising a housing for fluid lubrication bearing apparatuses according to claim 1, a bearing sleeve fixed on the inner periphery of the housing and a shaft.

16. A motor comprising the fluid lubrication bearing apparatus according to claim 15, a fixing member as a different component which adhesively fixes on an adhesion fixing face of the housing and fixes the fluid lubrication bearing apparatus on its inner periphery, a stator coil and a rotor magnet which produces excitation between itself and the stator coil.

* * * * *